(12) United States Patent
Hossler (10) Patent No.: US 6,948,594 B2
(45) Date of Patent: Sep. 27, 2005

(54) ROPE LOCKING DEVICE WITH AUTOMATIC SAFETY MECHANISM

(75) Inventor: Brad E. Hossler, Tiffin, OH (US)

(73) Assignee: Tiffin Scenic Design, Inc., Tiffin, OH (US)

( * ) Notice: Subject to any disclaimer, the term of this patent is extended or adjusted under 35 U.S.C. 154(b) by 299 days.

(21) Appl. No.: 10/074,599

(22) Filed: Feb. 13, 2002

(65) Prior Publication Data

US 2003/0094333 A1 May 22, 2003

Related U.S. Application Data

(63) Continuation-in-part of application No. 09/993,386, filed on Nov. 16, 2001.

(51) Int. Cl.$^7$ ............................................. B65H 59/16
(52) U.S. Cl. .................................... 188/65.1; 24/134 R
(58) Field of Search ........................... 188/65.1, 65.2; 24/134 R–134 P (56) References Cited

U.S. PATENT DOCUMENTS

| | | | | |
|---|---|---|---|---|
| 1,944,603 A | * | 1/1934 | Hecker | 24/134 R |
| 2,991,526 A | * | 7/1961 | Kuebler | 24/115 R |
| 3,327,999 A | * | 6/1967 | Mitchell | 24/134 R |
| 4,278,042 A | * | 7/1981 | Lindquist | 188/65.2 |
| 4,560,029 A | * | 12/1985 | Dalmaso | 182/5 |
| 4,669,582 A | * | 6/1987 | Sandreid | 188/65.1 |
| 4,729,456 A | * | 3/1988 | Sugiyama | 188/65.1 |
| 4,790,034 A | * | 12/1988 | Grosh | 24/132 WL |
| 4,912,817 A | * | 4/1990 | Sandreid | 24/132 R |
| 5,083,350 A | * | 1/1992 | Sandreid | 24/134 R |
| 5,531,297 A | * | 7/1996 | Pipan | 188/65.1 |
| 5,855,251 A | * | 1/1999 | Deuer | 188/65.2 |

OTHER PUBLICATIONS

Custom Rigging Systems: "Introducing The Magic–Loc" Greensboro NC 27405.
Prinout of Website: www.tiffinscenic.com (Jul. 22, 2002).

* cited by examiner

*Primary Examiner*—Robert A. Siconolfi
(74) *Attorney, Agent, or Firm*—Alice O. Martin; Barnes & Thornburg

(57) ABSTRACT

A rope locking device comprises a lock housing, guide housing, first and second shoe, means for suspending the first and second shoes, a handle, and cams operably connecting the handle to one of the shoes. The guide housing is positioned within the lock housing and translatably connected to the lock housing such that the guide housing can only move in the vertical direction. The first and a second shoes are contained within the guide housing such that the rope passes between them. The first shoe is suspended between the top and bottom of the guide housing, such that the first shoe can move vertically. The second shoe is suspended between the top and bottom of the guide housing such that the second shoe can translate vertically and horizontally. The handle has a locked and unlocked position. The first and second cam are pivotally mounted on the lock housing, the handle connected to the first cam, and the first and second cam operably connected to each other so that the rotations of the cams are equal. The cams are operably connected to the second shoe such that moving the handle to the locked position causes the second shoe to translate towards the first shoe without rotation. The rope lock also comprises an automatic closing means comprising a guide means that causes the second shoe to close more tightly against the first shoe when a load is placed on the rope after the lock has been manually closed.

6 Claims, 8 Drawing Sheets

ROPE LOCKING DEVICE WITH AUTOMATIC SAFETY MECHANISM

This application is a continuation-in-part of co-pending U.S. Ser. No. 09/993,386 filed Nov. 16, 2001.

BACKGROUND

The invention relates to devices that grip and maintain ropes in a desired position, and in particular to locking ropes used in suspension systems in theatrical applications, such as for suspending lights, curtains, scenery and other equipment in theaters. In particular, the devices include a novel automatic safety mechanism which prevents runaways due to an out-of-balance system.

In theatrical productions, displays, exhibitions, and other events, rigging systems are used to suspend scenery, curtains, lights, and other equipment. A counterweight rigging common in theatrical applications, is typically comprised of a head block, floor block, counterweight arbor, loft blocks, lift lines, a rope handline, and a rope lock. Previous attempts to control rope movement include rope locks and clutches, the latter only gripping rope in one direction. When the rope is pulled in the opposite direction, the clutch allows it to slip through. The Kuebler system (U.S. Pat. No. 2,991,526) is neither a clutch nor a rope lock, but only a safety mechanism. In the Kuebler system, a "dead man" pedal defeats the safety mechanism by removing the surface a shoe bears against. Another limitation is that the Kuebler system will not work on a 3-strand rope.

When counterweights are being added or removed, or when a load is added or removed from the lift lines, and the system is out of balance, the goal of a rope lock is to prevent uncontrolled movement of the rope, load, and counterweights. It is also desirable for the rope lock to automatically lock the rope in position and hold it, even if the operator opens the handle. However, rope locks suffer from one or more of the following deficiencies. They may lack the capability to lock the rope in place by manually moving a handle, lack the capability to automatically lock the rope in place in response to a sudden imbalance in the system or a runaway situation, and they may use jaws to grip the rope in a maimer that tends to cut into, pinch, and otherwise cause damage to the rope. In other words, some rope locks have no safety system, or have safety systems that need improvement.

A rope lock system is disclosed in FIG. 1 of U.S. Pat. No. 5,531,297 (Pipan). The item to be lifted (the load) is attached to the lift lines on stage, which are run through loft blocks overhead and to a counterweight arbor. Weight is added to the counterweight arbor to roughly balance the weight of the load plus necessary hardware. A rope or handline for raising and lowering the item is connected to the counterweight arbor, run up to and through the head block, down through a rope lock, then through a floor block, and back to the counterweight arbor. In a balanced system, the load can be raised or lowered with very little force applied to the handline. If the system is not balanced, it may require a substantial force on the handline to prevent either the load or weight arbor from crashing onto the floor and other equipment. To prevent this dangerous possibility, a rope lock or safety system is used to prevent the rope from moving as a result of an imbalance. The Pipan rope lock employs jaws that pivot under direct control of a handle. A disadvantage of this system is that under strong tension, the jaws pinch the rope contributing to rope destruction and dangerous accidents. What is needed is an improved rope lock with an automatic safety system.

SUMMARY

The rope lock of the present invention is a unit with an automatic mechanism to not allow rope movement when the handle is moved to the "open" position if the set is out of balance. The handle is not mounted on the housing. The lock can be used during shows in the same manner as it would be used for changeover from one show to the next. The linkage system of the present invention is unique in the art. Also, an axle is not needed.

An aspect of the present invention is that the system utilizes two shoes to grip the rope over a length of rope, distributing the gripping force instead of concentrating the force at a point or over a few gripping teeth as in jaws in the Pipan patent (U.S. Pat. No. 5,531,297). This structure reduces wear and tear on the rope compared to a system using pivoting jaws. Also, the linkage system is novel. The movement of the shoes is restricted by guides, guide pins and slots, and the locking rollers engage the back of the shoe, all of which ensure that the shoes close on the rope without any rotation of the shoes that might cause a concentrated gripping force instead of gripping the rope over the length of the shoes. In normal operation, one shoe moves toward the other instead of both moving toward each other. The shoes do not pivot, rather they move vertically and horizontally. The shoes close on the rope both in response to manual activation of a handle and in response to rope movement that would occur if the system is unbalanced. The shoes will not open unless the imbalance is overcome or corrected. The invention works on a three strand rope, and other rope configurations.

DETAILED DESCRIPTION OF THE PREFERRED EMBODIMENT

The rope lock of the present invention includes an automatic safety mechanism that is always ready to react to weight imbalance in a rigging.

Figure 1:
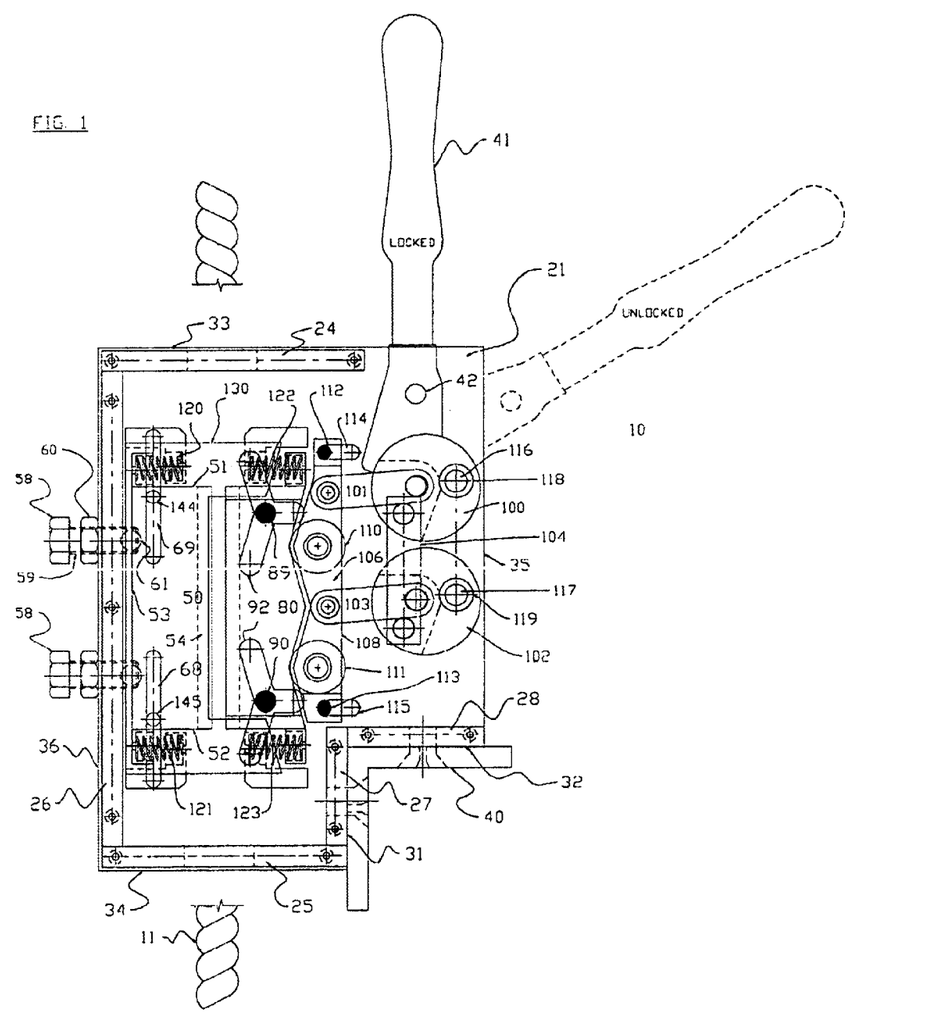
FIG. 1 is a view of the rope locking device with the left side plate removed to reveal the mechanism.

FIG. 1 illustrates a preferred embodiment of the rope locking device 10. It is understood that the rope handline 11 in theatrical rigging is typically run vertically between a floor block and a head block. The rope lock mechanism is contained within a housing 21. In a preferred embodiment, the housing comprises a first and second side plate 22 and 23, a top 24, bottom 25 and rear 26, and a first and second mounting plate 27 and 28. The top, bottom, and rear 24, 25, and 26 and mounting plates 27 and 28 are fastened to the side plates 22 and 23 through any appropriate means. In a disclosed embodiment, they are attached by screws. In a disclosed embodiment, the first and second side plates 22 and 23 each comprise a first and second mounting edge 31 and 32 as well as a top 33, bottom 34, front 35, and rear edge 36. The top 24, bottom 25, and rear 26 connecting plates are attached respectively to the top 33, bottom 34, and rear edges 36 of the first and second side plates 22 and 23. The first and second mounting plates 27 and 28 are attached respectively to the first and second mounting edges 31 and 32 of the first and second side plates 22 and 23.

The rope locking device further comprises a mounting angle 40, typically a piece of angle iron attached to the first and second mounting plates 22 and 23 with hex head screws. The mounting angle 40 is attached, usually with bolts, to a customer's locking rail, typically a steel frame bolted to the floor.

The rope locking device further comprises, a handle 41 with a locked and unlocked position, and within the housing, a first and a second shoe 50 and 80, a means 58 for preloading the first and second shoe, a means for closing the shoes when the handle is moved to the locked position, and a means to engage the automatic mechanism, such as might occur if the load and counterweight were out of balance. The automatic mechanism will not open even if the handle is moved to the unlocked position.

Figure 2:
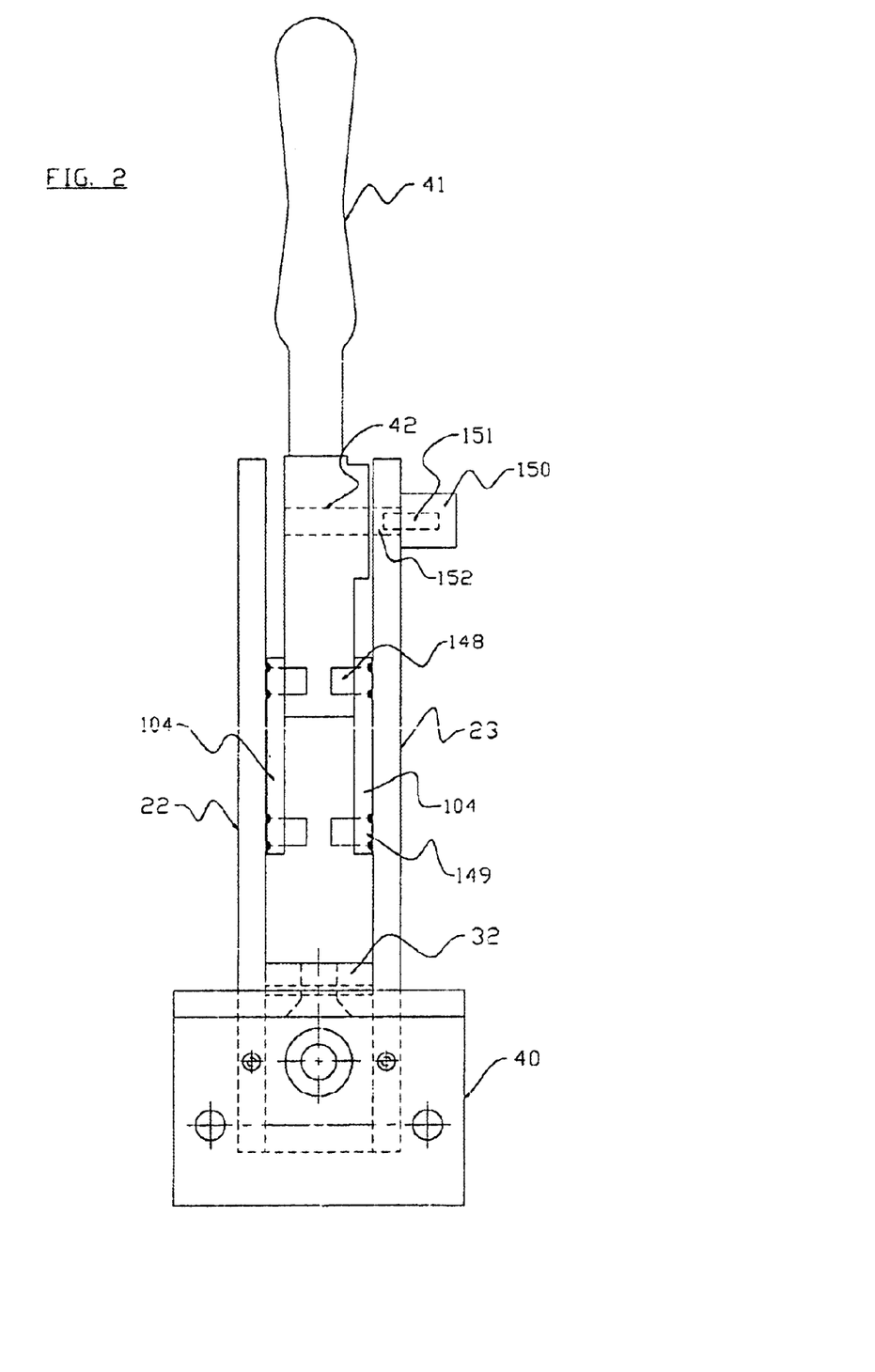
FIG. 2 is a view of the rope locking device from the front.

In FIG. 2, a commercially available keyed plunger lock 150 shown attached to side plate 23 can be used to ensure that the handle cannot be moved out of the locked position. The plunger 151, when activated, passes through a hole 152 defined by side plate 23. When the handle is in the locked position, the plunger is received in hole 42 defined by the handle, which locks the handle 41 in place.

Figure 3A:
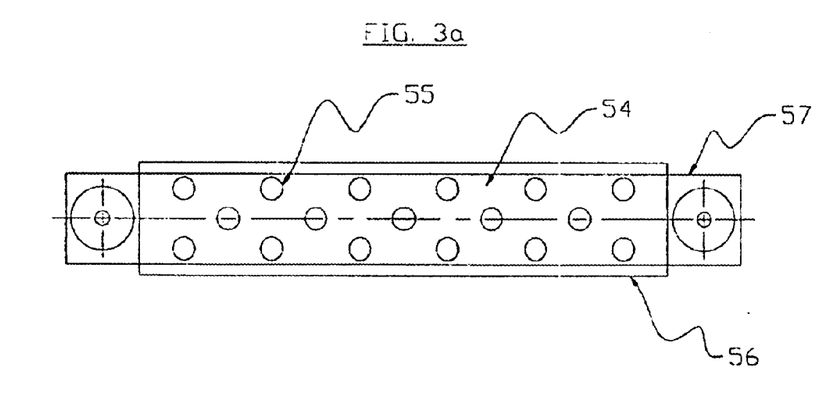
FIGS. 3a, b, and c are front, top, and side views of the first shoe.
Figure 3B:
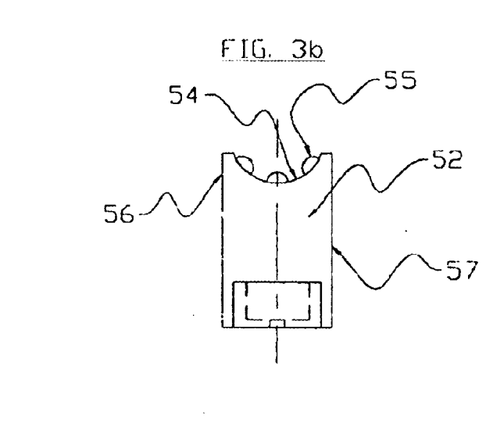
Figure 3C:
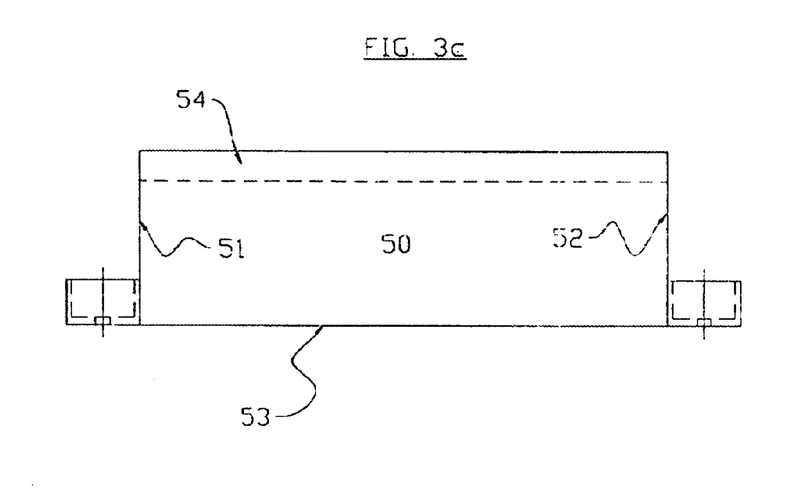

The first shoe 50 is a block comprising a top 51, bottom 52, rear 53, front 54, and a first and second lateral side 56 and 57. The front 54, which engages the rope passing between the shoes, is recessed to receive the rope 11. In a preferred embodiment, shown in FIGS. 3a and b, the front 54 is recessed in a semicircular shape with a plurality of raised beads 55; however, the recess may have any other appropriate shape, such as V-shaped or half round, and may be roughened in some other manner to increase its gripping ability. It may be shaped to fit the rope.

Figure 6A:
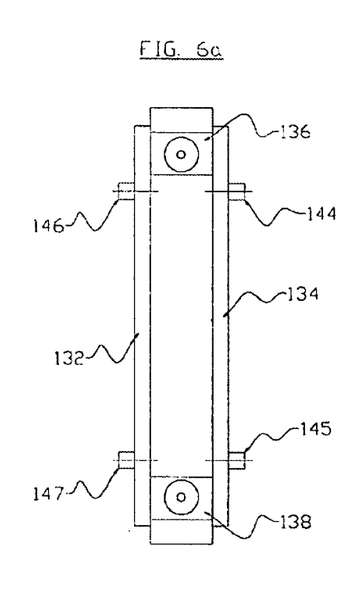
FIGS. 6a, b, c, and d are the back, side, front, and lower views of the guide housing respectively.
Figure 6B:
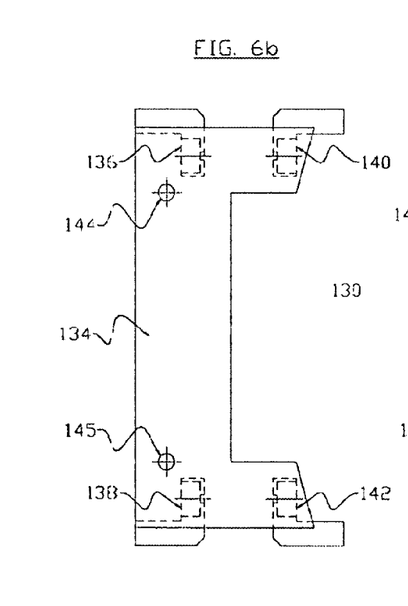
Figure 6C:
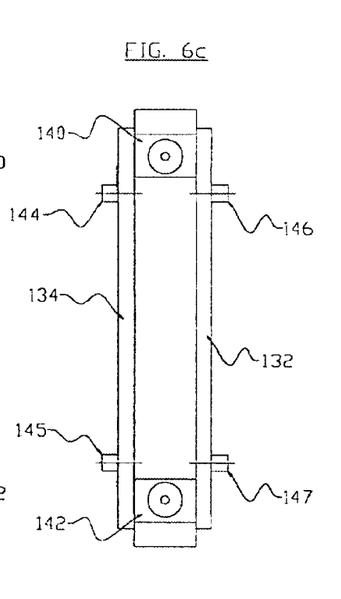
Figure 6D:
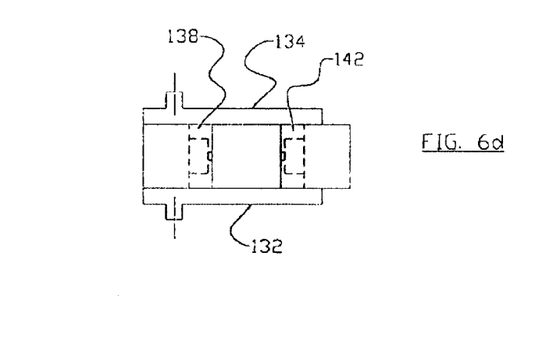
Figure 7:
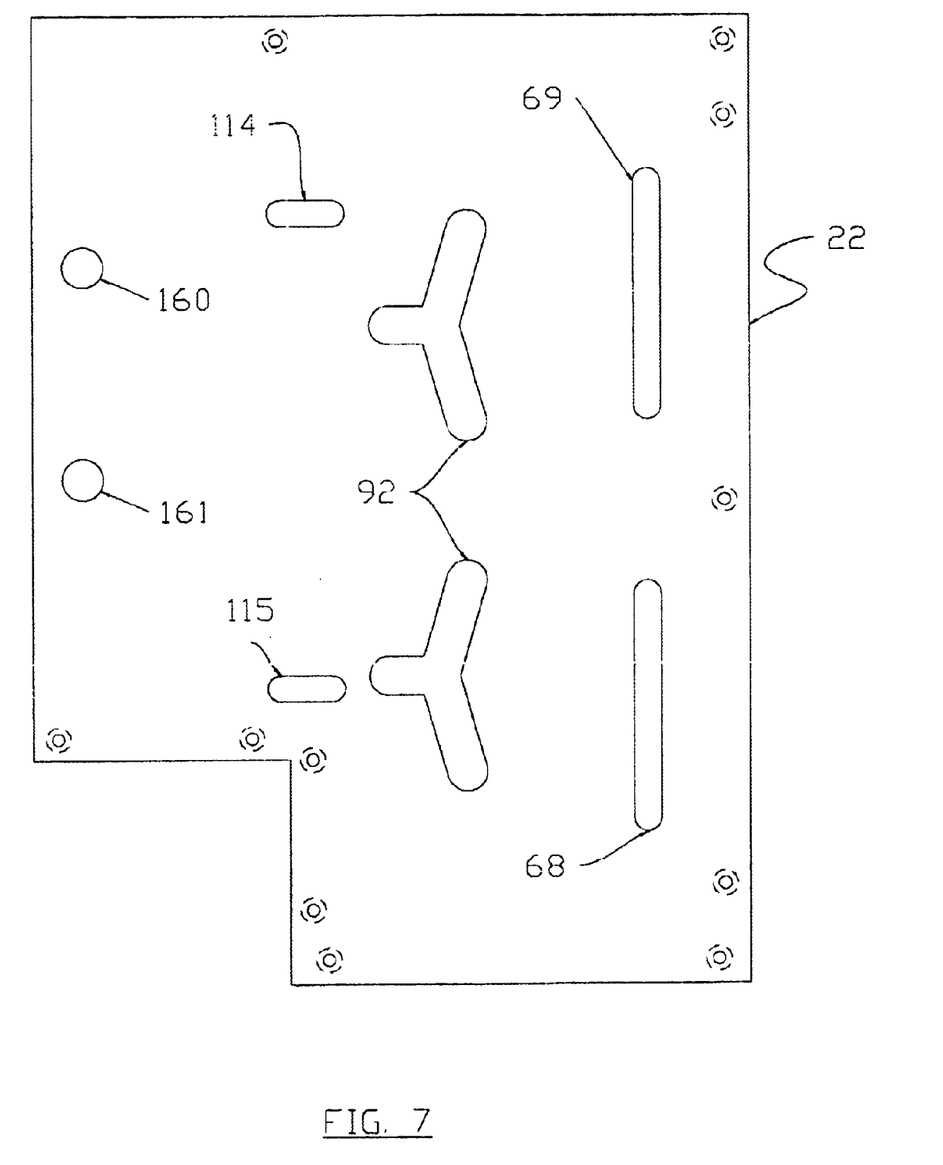
FIGS. 7 and 8 are the side views of the first and second side plates respectively.
Figure 8:
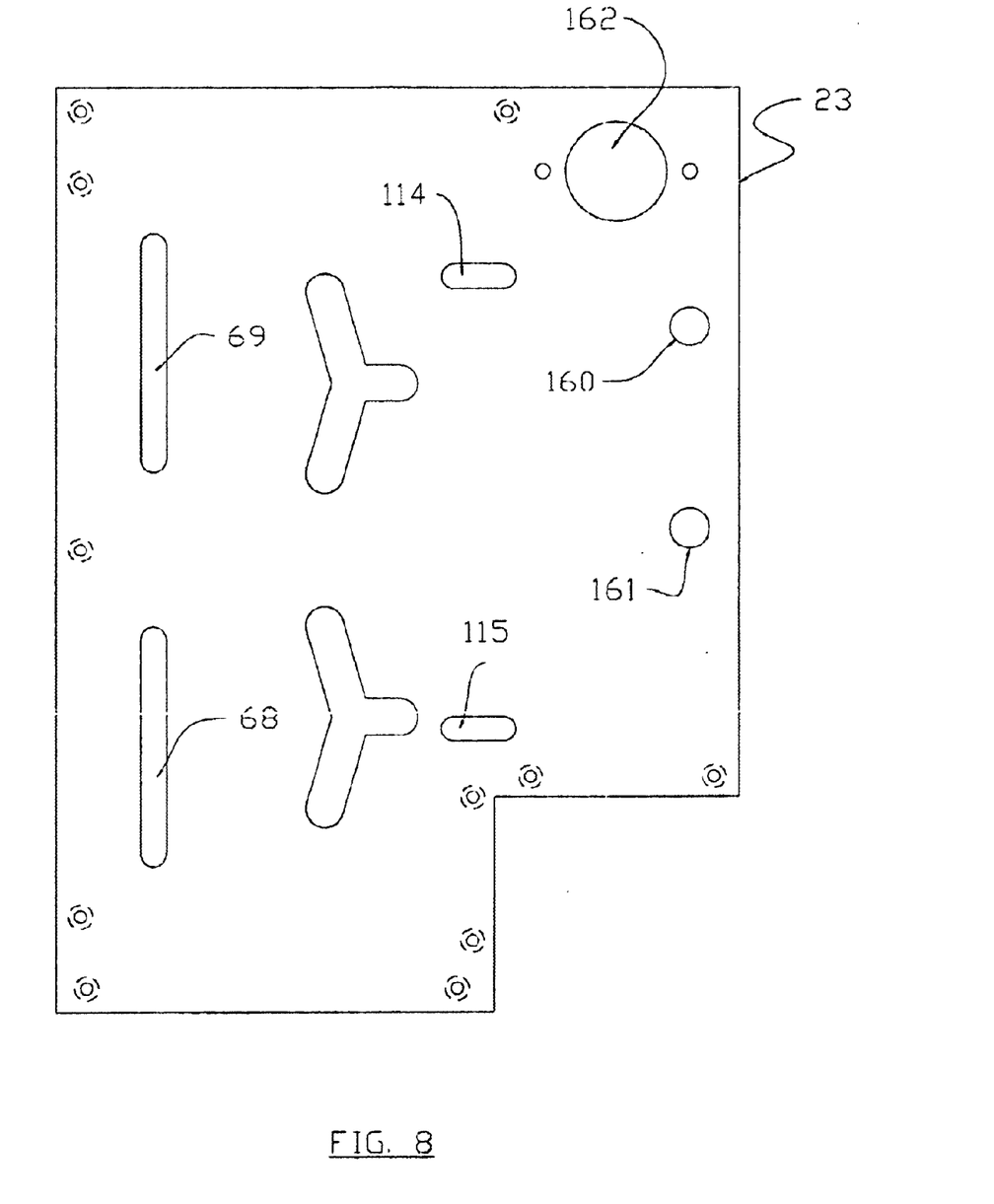

FIG. 6a shows a guide housing 130 positioned within the housing 21 to guide and limit the movement of the first and second shoes 50 and 80. The guide housing 130 comprises a first and second side plate 132 and 134, and a first shoe upper guide 136, a first shoe lower guide 138, a second shoe upper guide 140, and a second shoe lower guide 142, the first and second upper and lower shoe guides all positioned between and connected to the two side plates 132 and 134. Pins 144 and 145 extend from the first guide housing side plate 134 are received in slots 68 and 69 of side plate 22 and pins 146 and 147 are received in slots (not shown) defined by side plate 23 that are parallel and aligned with slots 68 and 69.

The first shoe 50 is inside the guide housing 130 between the first and second side plates 132 and 134, the guide housing positioned between the first and second side plates 22 and 23, against the rear of the housing 26 and is positioned between upper first shoe guide 136 and lower first shoe guide 138. One or more shoe adjustment screws 58, threaded through the rear 26 of the housing 21, contact the rear face 53 of the first shoe 50. In a preferred embodiment, the one or more shoe adjustment screws 58 comprise a threaded bolt 59 and jam nut 60, the end of the bolt being counterbored, and a ball bearing 61 placed therein contacts the rear of the first shoe 53. The screw 58 can be tightened or loosened to properly position the first shoe 50 relative to the rope. The ball bearings 61 reduce resistance to vertical translation of the first shoe 50.

Figure 4A:
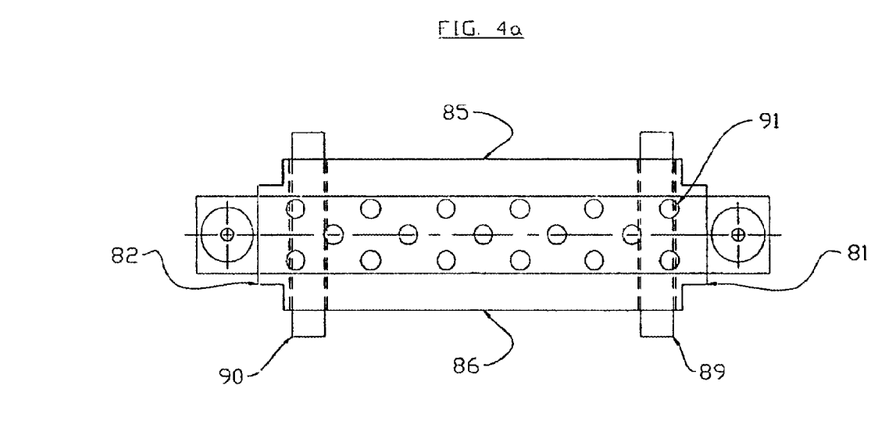
FIGS. 4a, b, and c are rear, top, and side views of the second shoe.
Figure 4B:
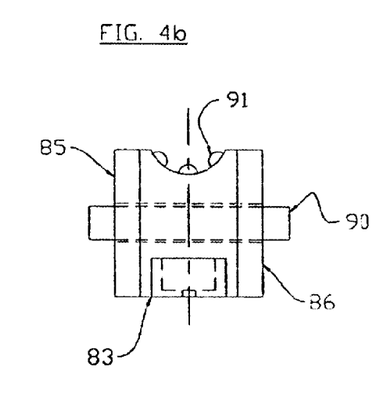
Figure 4C:
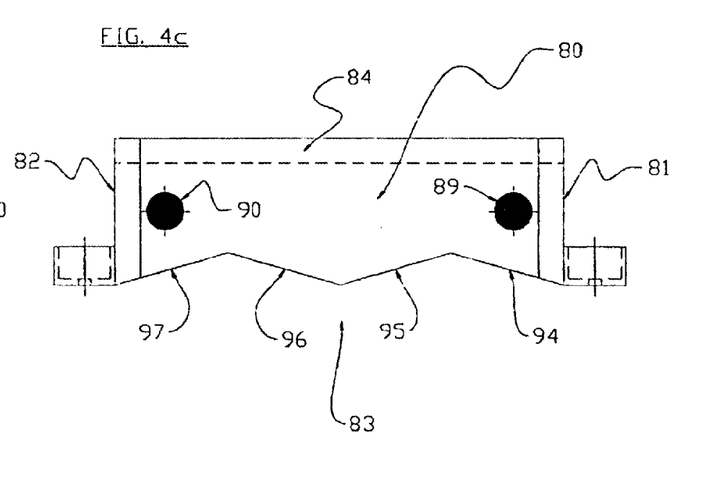

As seen in FIG. 4, the second shoe 80 comprises a block with a top 81, bottom 82, front 83, back 84, and a left and right side 85 and 86. The back 84 of the second shoe 80 is recessed and has raised beads 91 similar to the front of the first shoe 50, so that when the shoes are brought together, they both receive and grip the rope 11. The second shoe 80 is suspended between the upper second shoe guide 140 and lower second shoe guide 142 and is contiguous to horizontal resilient members 120, 121, 122 and 123. The second shoe 80 further comprises a pair of upper and lower guide pins 89, 90, which extend from each lateral side of the shoe 85, 86 and are received in the plurality of Y-shaped slots 92 defined by the side plates 22, 23. The Y-shaped slots 92 are oriented so that one leg of the slot extends horizontally enabling the second shoe 80 to translate horizontally when the lock is opened. The other legs of the Y-slot are inclined, such that when the lock is closed and the rope 11 moves vertically, shoes 50 and 80, which are gripping the rope, move vertically with the rope and the second shoe guide pins 89, 90 in the inclined portion of the Y-shaped slots 92 cause the second shoe 80 to also translate towards the rope 11, gripping it more tightly. The front 83 of the second shoe 80 comprises a plurality of sections 94, 95, 96, 97 (FIG. 4c) inclined from the vertical and substantially parallel to the inclined portions of the Y-shaped slots 92. In a preferred embodiment, grooves 92 are funnel shaped.

Figure 5A:
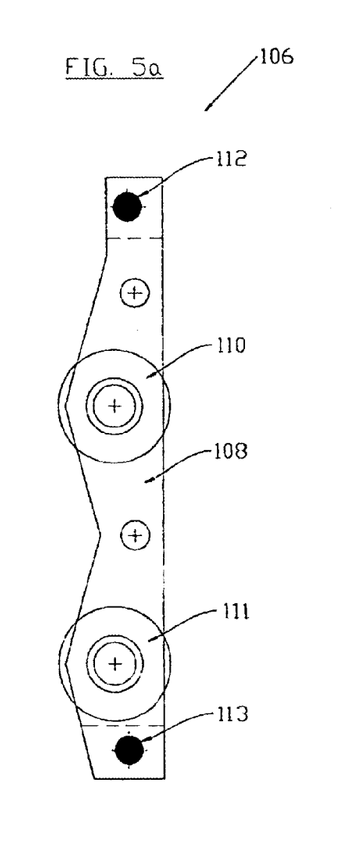
FIGS. 5a and b are a front and side views of the lock roller assembly.
Figure 5B:
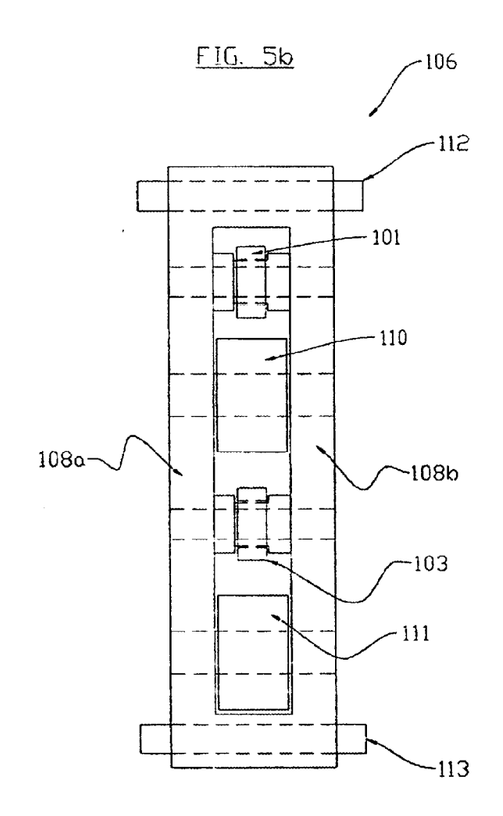

The means for manually closing the shoes comprises a handle 41, an upper and lower cam 100, 102 connected by a cam linkage plate 104, and linkage pins 148 and 149, and a locking roller assembly 106 connected to the upper and lower cams 100, 102 by an upper and lower linkage plate 101, 103, respectively, the linkage plates 101 and 103 being pivotally connected to the cams 100 and 102 at one end and pivotally connected to the locking roller assembly 106 at the other end (FIG. 5). The locking roller assembly 106 comprises a roller base plate 108 or a pair of parallel base plates 108a and 108b, and a plurality of rollers 110, 111 pivotally mounted on the base plate 108. Roller base plate pins 112, 113 extend outward from the base plate 108 and are received by a plurality of horizontal roller guide slots 114, 115 defined by the first and second side plates. The upper and lower cams 100, 102 are pivotally mounted on an upper and a lower cam pin 116, 117, respectively, which are received in upper and lower cam pin holes 118, 119 defined by the side plates 22, 23. The cam linkage plate 104 is pivotally connected to the upper and lower cam 100, 102, such that the rotation of the cams are equal. An upper and a lower linkage plate 101, 103 connect the roller base plate 108 to the upper and lower cams 100, 102 respectively. Consequently, rotation of either cam causes the other cam to rotate an equal amount and causes the linkage plates 101, 103 to move the locking roller assembly 108 horizontally, without any rotation or vertical translation.

The handle 41 may be connected to the upper cam 100 in any known manner, such as by being bolted or welded thereto, or as in the illustrated embodiment, being cast integral to the upper cam 100. With the handle 41 in the locked position, the cams 100, 102, through the linkage plates 101, 103, have pushed the rollers 110, 111 of the locking roller assembly 106 in contact with the front 83 of second shoe 80, causing the shoes to clamp onto the rope 11. The use of rollers 110 and 111 minimizes friction between the roller assembly 106 and the front 83 of the second shoe 80. In the unlocked position, the rotation of the cams 100, 102 pulls the locking roller assembly 106 away from the front 83 of the second shoe 80.

In a preferred embodiment, the closed lock can automatically tighten on the rope and remain engaged even if the handle is opened. In a preferred embodiment, a means for preloading the first and second shoes comprises horizontal elastomeric members 120, 121, 122, 123, preferably coiled springs, which on one end are contiguous to the first and second shoes 50, 80 respectively and on the other end are contiguous to the guide housing upper and lower shoe guides 136, 138, 140, and 142 (FIG. 6). The springs may be connected to the shoes and shoe guides in any appropriate manner. With the lock manually closed and a rope movement caused by an unbalanced system, the resulting vertical movement of the second shoe guide pins 89, 90 in the second shoe guide slots 92 would cause the second shoe to close more tightly on the rope 11. The automatic locking means would remain engaged until the loads and counterweight on the system were sufficiently balanced to enable the rope 11 to be moved in the direction opposite to the direction it was running, thereby moving the second shoe 80 to loosen grip on the rope.

I claim:

1. A device for locking a rope in place wherein the rope is moving in either a forward or reverse direction, comprising:

a lock housing with a top, a bottom, and a rear;

a guide housing positioned within said lock housing, said guide housing translatably connected to the lock housing such that the guide housing can only move in the vertical direction;

a first and a second shoe contained within the guide housing such that the rope passes between them;

a first means for positioning the first shoe between the top and bottom of the guide housing, such that the first shoe can move vertically;

a second means for positioning the second shoe between the top and bottom of the guide housing such that the second shoe can translate vertically and horizontally;

a handle with a locked and unlocked position;

a first and second cam pivotally mounted on the housing, the handle connected to the first cam, and the first and second cam operably connected to each other so that the rotations of the cams are equal, said cams operably connected to the second shoe such that moving the handle to the locked position causes the second shoe to translate towards the first shoe without rotation.

2. The device of claim 1, further comprising an automatic closing means comprising:

a guide means that causes the second shoe to close more tightly against the first shoe when a load is placed on the rope after the lock has been manually closed.

3. The device of claim 2, wherein the automatic closing means remains engaged when the handle is moved to the open position.

4. The device of claim 3, wherein the automatic closing means remains engaged until the load on the rope is removed.

5. A device for locking a rope in place in a system, comprising a lock housing;

a first and a second shoe contained within said housing such that the rope passes between the shoes;

means for positioning the first shoe between the top and bottom of the housing, such that the first shoe can translate towards the top or bottom of the housing;

means for positioning the second shoe between the top and bottom of the housing such that the second shoe can translate vertically towards the top or bottom of the housing, and also translates towards or away from the first shoe;

a handle with a locked and unlocked position;

means for closing the second shoe in response to moving the handle to the locked position such that the second shoe translates towards the first shoe without rotation.

6. The device of claim 5, further comprising a means for automatically holding the second shoe in the closed position in response to placing a load on the rope while the second shoe is in the closed position.

* * * * *

UNITED STATES PATENT AND TRADEMARK OFFICE
CERTIFICATE OF CORRECTION

PATENT NO. : 6,948,594 B2
DATED : September 27, 2005
INVENTOR(S) : Brad E. Hossler It is certified that error appears in the above-identified patent and that said Letters Patent is hereby corrected as shown below:

Title page,
Item [73], Assignee, "Tiffin Scenic Design, Inc." should read -- Tiffin Scenic Studios, Inc. --.

Signed and Sealed this

Thirteenth Day of December, 2005

JON W. DUDAS
*Director of the United States Patent and Trademark Office*